US009319559B2

(12) United States Patent
Furutani (10) Patent No.: US 9,319,559 B2
(45) Date of Patent: Apr. 19, 2016

(54) IMAGE PROCESSING SYSTEM, IMAGE PROCESSING APPARATUS, AND INFORMATION PROCESSING APPARATUS (71) Applicant: KYOCERA Document Solutions Inc., Osaka-shi, Osaka (JP)

(72) Inventor: Hiroshi Furutani, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/664,697

(22) Filed: Mar. 20, 2015

(65) Prior Publication Data
US 2015/0281511 A1  Oct. 1, 2015

(30) Foreign Application Priority Data

Mar. 26, 2014 (JP) ................................. 2014-063655

(51) Int. Cl.
*H04N 1/32* (2006.01)
*H04N 1/44* (2006.01)
*H04N 1/00* (2006.01)

(52) U.S. Cl.
CPC ....... *H04N 1/32673* (2013.01); *H04N 1/00206* (2013.01); *H04N 1/00307* (2013.01); *H04N 1/00973* (2013.01); *H04N 1/32037* (2013.01); *H04N 1/3263* (2013.01); *H04N 1/32117* (2013.01); *H04N 1/32496* (2013.01); *H04N 1/32662* (2013.01); *H04N 1/32667* (2013.01); *H04N 1/4433* (2013.01); *H04N 2201/0075* (2013.01); *H04N 2201/0094* (2013.01)

(58) Field of Classification Search
USPC ....................................... 358/1.14, 1.15, 474
See application file for complete search history.

(56) References Cited

U.S. PATENT DOCUMENTS

| 8,531,687 B2* | 9/2013 | Shozaki | H04N 1/00241 358/1.13 |
| 9,020,847 B2* | 4/2015 | Ishii | G06Q 10/08 705/28 |
| 9,036,178 B2* | 5/2015 | Norota | G06F 3/121 358/1.14 |
| 2009/0190187 A1* | 7/2009 | Cornell | B41J 29/393 358/474 |
| 2011/0149331 A1* | 6/2011 | Duggan | G06K 9/036 358/1.14 |
| 2011/0157644 A1* | 6/2011 | Suzuki | G03G 15/5012 358/1.15 |

(Continued)

FOREIGN PATENT DOCUMENTS

JP          2005064762 A      3/2005

*Primary Examiner* — Allen H Nguyen
(74) *Attorney, Agent, or Firm* — Alleman Hall McCoy Russell & Tuttle LLP (57) ABSTRACT Image processing system includes detection portion, first transmission portion, changing portion, second transmission portion, and job executing portion. The detection portion detects error of the job executed by image processing apparatus. The first transmission portion transmits error information and setting information to predetermined information processing apparatus, the error information being related to the error detected by the detection portion, the setting information being related to the job in which the error occurred. The changing portion, provided in the information processing apparatus, changes the setting information. The second transmission portion, provided in the information processing apparatus, transmits, to the image processing apparatus, re-execution instruction that includes the setting information that has been changed by the changing portion, the re-execution instruction instructing to re-execute the job. The job executing portion re-executes the job based on the setting information and the re-execution instruction transmitted by the second transmission portion.

7 Claims, 5 Drawing Sheets

(56) References Cited

U.S. PATENT DOCUMENTS

2014/0019661 A1* 1/2014 Hormuth ............ G06F 15/17331
  710/306

2014/0082544 A1* 3/2014 Umeizumi ......... H04N 1/00411
  715/772

* cited by examiner

IMAGE PROCESSING SYSTEM, IMAGE PROCESSING APPARATUS, AND INFORMATION PROCESSING APPARATUS

INCORPORATION BY REFERENCE

This application is based upon and claims the benefit of priority from the corresponding Japanese Patent Application No. 2014-063655 filed on Mar. 26, 2014, the entire contents of which are incorporated herein by reference.

BACKGROUND

The present disclosure relates to an image processing system including an image processing apparatus and an information processing apparatus, and to an image processing method executed in the image processing system.

An image processing apparatus such as a multifunction peripheral is configured to execute various jobs such as a print job and a transmission job, wherein in the print job, a print process is executed with respect to print data transmitted from a communication apparatus, and in the transmission job, the read image data is transmitted to an external apparatus. Meanwhile, an error may occur in a job while the job is executed in the image processing apparatus. In that case, the user solves the cause of the error at the site where the image processing apparatus is installed, and re-executes the job. It is noted that there is known a related technology in which, when an error occurs in the image processing apparatus, an information processing apparatus such as a mobile terminal is notified of the occurrence of the error and the error handling method.

SUMMARY

An image processing system according to an aspect of the present disclosure is an image processing system including an image processing apparatus configured to execute a job related to image processing and an information processing apparatus, and includes a detection portion, a first transmission portion, a changing portion, a second transmission portion, and a job executing portion. The detection portion is configured to detect an error of the job executed by the image processing apparatus. The first transmission portion is configured to transmit error information and setting information to a predetermined information processing apparatus, the error information being related to the error detected by the detection portion, the setting information being related to the job in which the error occurred. The changing portion is provided in the information processing apparatus and configured to change the setting information. The second transmission portion is provided in the information processing apparatus and configured to transmit, to the image processing apparatus, a re-execution instruction that includes the setting information that has been changed by the changing portion, the re-execution instruction instructing to re-execute the job. The job executing portion is configured to re-execute the job based on the setting information and the re-execution instruction transmitted by the second transmission portion.

An image processing apparatus according to another aspect of the present disclosure includes a detection portion, a first transmission portion, and a job executing portion. The detection portion is configured to detect an error of a job related to image processing. The first transmission portion is configured to transmit error information and setting information to a predetermined information processing apparatus, the error information being related to the error detected by the detection portion, the setting information being related to the job in which the error occurred. The job executing portion is configured to re-execute the job based on a re-execution instruction transmitted from the information processing apparatus, and the setting information that has been changed by the information processing apparatus.

An information processing apparatus according to a further aspect of the present disclosure includes a changing portion and a second transmission portion. The changing portion is configured to change setting information that is received from an image processing apparatus that executes a job related to image processing, the setting information being related to the job. The second transmission portion is configured to transmit, to the image processing apparatus, a re-execution instruction that includes the setting information that has been changed by the changing portion, the re-execution instruction instructing to re-execute the job.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings for the understanding of the disclosure. It should be noted that the following description is an example of a specific embodiment of the present disclosure and should not limit the technical scope of the present disclosure.

[Image Processing System 100]

Figure 1:
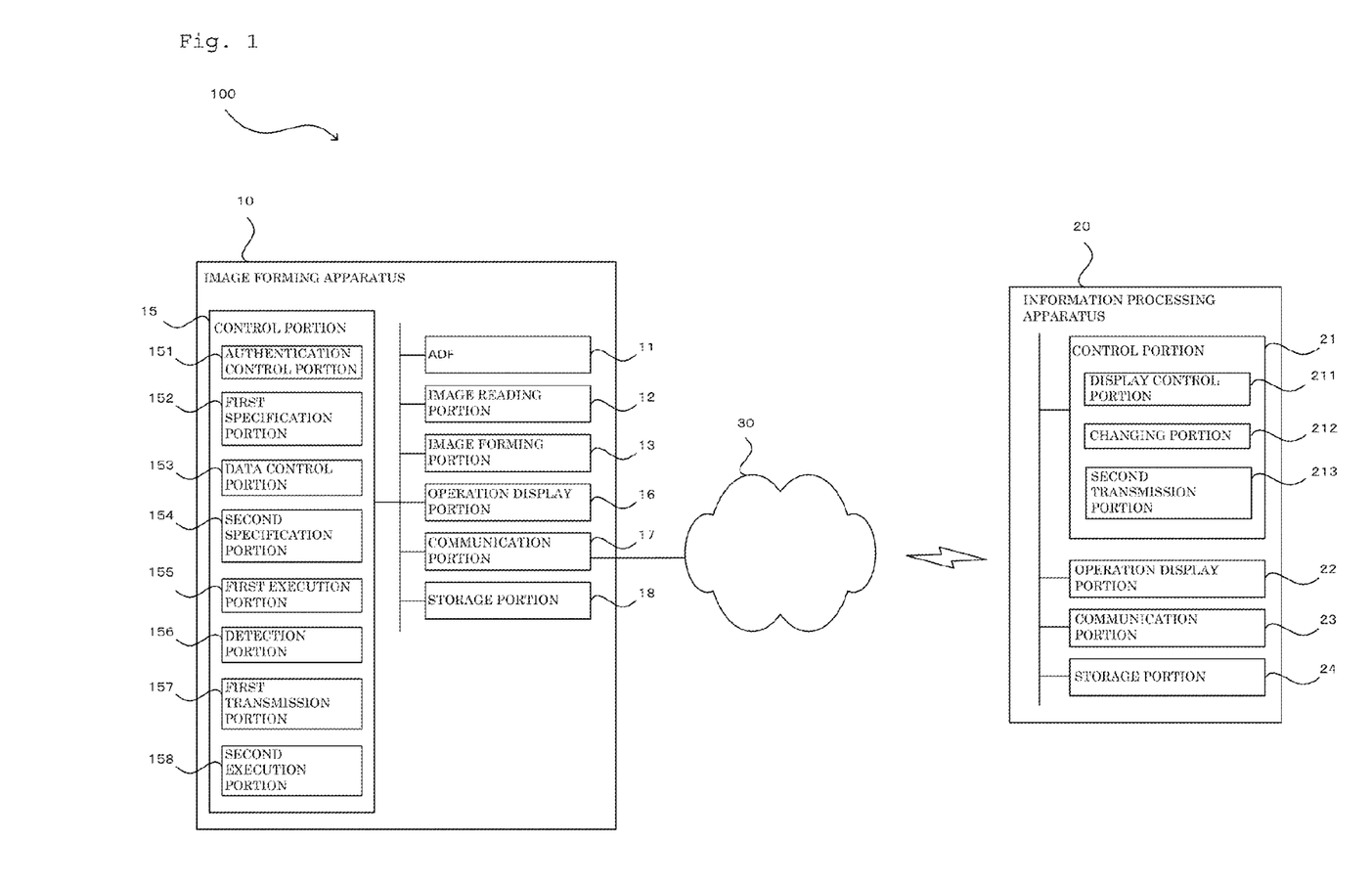
FIG. 1 is a diagram showing the configuration of an image processing system according to an embodiment of the present disclosure.

As shown in FIG. 1, an image processing system 100 according to the embodiment of the present disclosure includes an image forming apparatus 10 and an information processing apparatus 20. The image forming apparatus 10 and the information processing apparatus 20 can be connected to each other via a communication network 30 which is, for example, the Internet or a LAN.

[Image Forming Apparatus 10]

Figure 2:
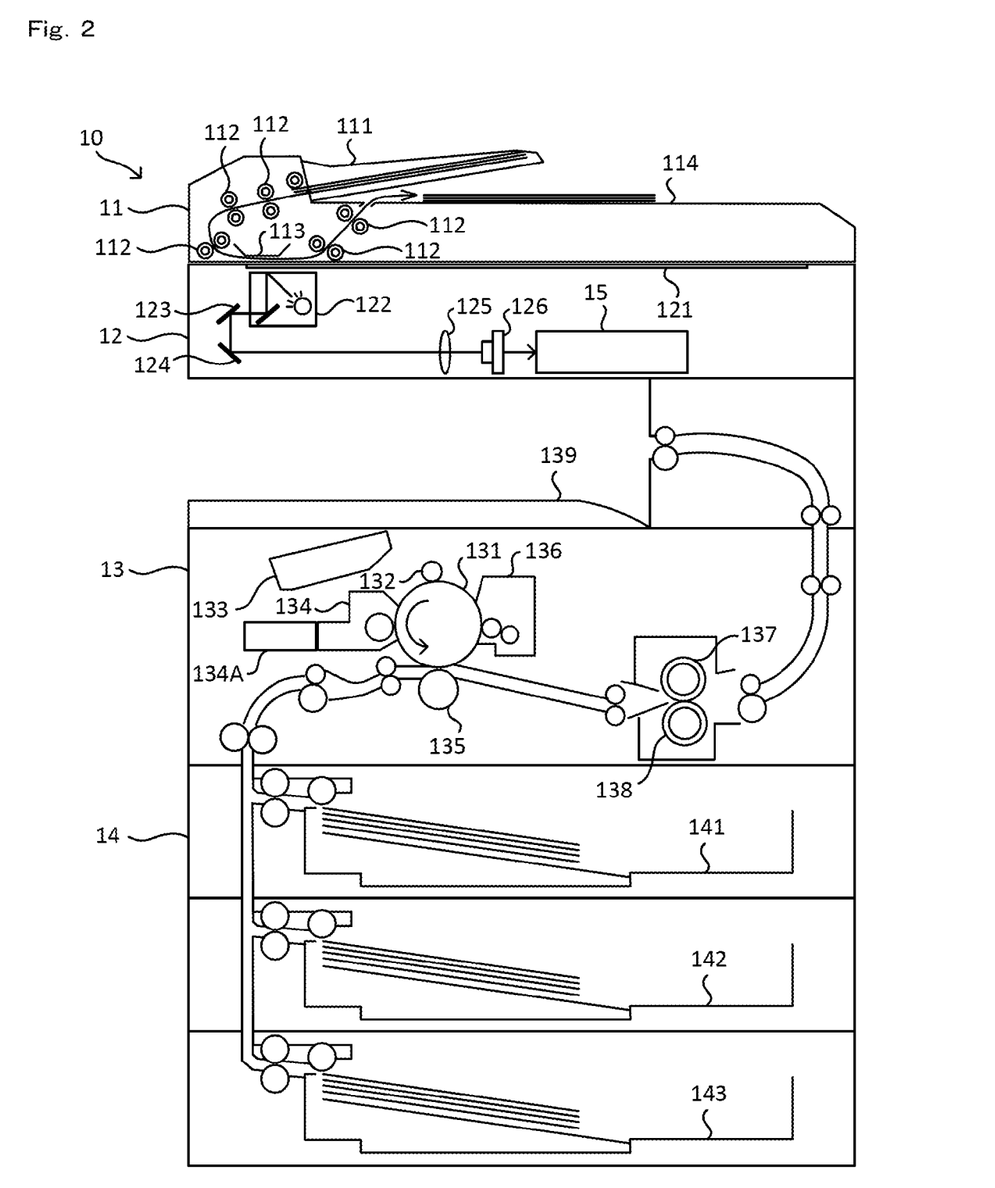
FIG. 2 is a diagram showing the configuration of an image forming apparatus according to the embodiment of the present disclosure.

As shown in FIGS. 1 and 2, the image forming apparatus 10 includes an ADF 11, an image reading portion 12, an image forming portion 13, a sheet feed portion 14, a control portion 15, an operation display portion 16, a communication portion 17, and a storage portion 18. The image forming apparatus 10 is a multifunction peripheral having a plurality of functions such as a facsimile function and/or a copy function, as well as a scan function to read image data from a document sheet, and a printer function to form an image based on the image data. Here, an apparatus that includes the control portion 15 is an example of the image processing apparatus of the present disclosure. It is noted that the present disclosure is applicable to an image reading apparatus or an image forming apparatus such as a printer, a scanner, a facsimile apparatus, and a copier.

As shown in FIG. 2, the ADF 11 is an automatic document sheet feeding device that includes a document sheet setting portion 111, a plurality of conveying rollers 112, a document sheet pressing 113, and a sheet discharge portion 114. In the ADF 11, the conveying rollers 12 are driven respectively by motors (not shown) such that a document sheet placed on the document sheet setting portion 111 is conveyed to pass through an image data reading position where the image data is read by the image reading portion 12, and then conveyed to the sheet discharge portion 114. With this configuration, the image reading portion 12 can read image data from the document sheet conveyed by the ADF 11.

The image reading portion 12 is configured to execute an image reading process to read image data from a document sheet. Specifically, as shown in FIG. 2, the image reading portion 12 includes a document sheet table 121, a reading unit 122, a mirror 123, a mirror 124, an optical lens 125, and a CCD (Charge Coupled Device) 126. The document sheet table 121 is a document sheet placing portion provided on the upper surface of the image reading portion 12. The reading unit 122 includes an LED light source and a mirror, and is movable in a sub scanning direction (the left-right direction in FIG. 2) by a motor (not shown). The LED light source includes a number of white LEDs arranged along a main scanning direction (the depth direction in FIG. 2). The mirror reflects, toward the mirror 123, light which was irradiated from the LED light source and reflected on the surface of the document sheet at the reading position on the document sheet table 121. The light reflected on the mirror of the reading unit 122 is guided into the optical lens 125 by the mirror 123 and the mirror 124. The optical lens 125 condenses the incident light and makes the condensed light incident on the CCD 126. The CCD 126 includes a photoelectric converting element and the like, wherein the photoelectric converting element inputs an electric signal that corresponds to the amount of light incident from the optical lens 125, to the control portion 15 as image data of the document sheet.

The image forming portion 13 is an electrophotographic image forming portion that can execute an image forming process of forming an image based on the image data read by the image reading portion 12. The image forming portion 13 can also execute the image forming process based on image data that has been input from an external communication device via the communication network 30.

Specifically, as shown in FIG. 2, the image forming portion 13 includes a photoconductor drum 131, a charging device 132, an optical scanning device (LSU) 133, a developing device 134, a transfer roller 135, a cleaning device 136, a fixing roller 137, a pressure roller 138, and a sheet discharge tray 139. In the image forming portion 13, an image is formed in the following procedure on a sheet supplied from the sheet feed portion 14. The sheet with the image formed thereon is discharged onto the sheet discharge tray 139. It is noted that the sheet is a sheet-like material such as a sheet of paper, a sheet of coated paper, a postcard, an envelope, or an OHP sheet.

First, the charging device 132 charges the surface of the photoconductor drum 131 uniformly into a certain potential. Next, the optical scanning device 133 irradiates the surface of the photoconductor drum 131 with light based on the image data. With this operation, an electrostatic latent image corresponding to the image data is formed on the surface of the photoconductor drum 131. Then the electrostatic latent image on the photoconductor drum 131 is developed (visualized) to a toner image by the developing device 134. It is noted that the toner (developer) is supplied to the developing device 134 from a toner container 134A that is attachable and detachable to/from the image forming portion 13. Subsequently, the toner image formed on the photoconductor drum 131 is transferred to a sheet by the transfer roller 135. The sheet is then conveyed to pass through between the fixing roller 137 and the pressure roller 138, where the toner image transferred to the sheet is heated by the fixing roller 137 in such a way as to be fused and fixed to the sheet. It is noted that the toner that has remained on the surface of the photoconductor drum 131 is removed by the cleaning device 136.

The sheet feed portion 14 supplies sheets to the image forming portion 13. Specifically, the sheet feed portion 14 includes a first sheet feed cassette 141, a second sheet feed cassette 142, and a third sheet feed cassette 143 that can be attached to and detached from the image forming apparatus 10 and store sheets of various sizes. For example, sheets of A4 size are stored in the first sheet feed cassette 141 and the second sheet feed cassette 142, and sheets of A3 size are stored in the third sheet feed cassette 143.

The control portion 15 includes control equipment (not shown) such as CPU, ROM, RAM, and EEPROM. The CPU is a processor for executing various types of arithmetic processes. The ROM is a nonvolatile storage portion in which various types of information such as control programs for causing the CPU to execute various types of processes are stored in advance. The RAM is a volatile storage portion, and the EEPROM is a nonvolatile storage portion. The RAM and the EEPROM are used as temporary storage memories (working areas) for the various types of processes executed by the CPU. The control portion 15 comprehensively controls the image forming apparatus 10 by executing the various types of control programs stored in advance in the ROM, by using the CPU. It is noted that the control portion 15 may be an electronic circuit such as an integrated circuit (ASIC).

Here, in the image forming apparatus 10, jobs relating to the image processing are executed when the control portion 15 executes the control programs. Specifically, the jobs executed by the image forming apparatus 10 include a transmission job and a print job.

The transmission job is a job to transmit image data read by the image reading portion 12 to the external communication device via the communication network 30. The control portion 15 executes the transmission job based on first setting information relating to the transmission job input from the operation display portion 16. For example, the first setting information includes a transmission destination, a reading resolution, and a data format of the image data to be transmitted.

The print job is a job to execute the image forming process based on the image data read by the image reading portion 12, or the image data input from the external communication device via the communication network 30. The control portion 15 executes the print job based on second setting information relating to the image data read by the image reading portion 12 or input from the external communication device via the communication network 30. For example, the second setting information includes information specified for the image forming process, such as the number of prints, a printing page range, an output magnification of image data, a sheet feed cassette to be used, and a sheet size. It is noted that the first setting information and the second setting information are collectively called setting information.

The operation display portion 16 includes a display portion and an operation portion, wherein the display portion is, for example, a liquid crystal panel that displays various types of information in response to control instructions from the control portion 15, and the operation portion is composed of operation keys or a touch panel for inputting various types of information to the control portion 15 in response to operations of the user.

The communication portion 17 executes a wired or wireless data communication with an external communication device such as the information processing apparatus 20 via the communication network 30.

The storage portion 18 is a storage portion such as SSD or HDD. The image data read by the image reading portion 12 is stored in the storage portion 18. In addition, the storage portion 18 stores authentication information that is used to allow the user to log in depending on a predetermined authentication operation. Specifically, the authentication information is a user name and a password that are defined for each user in advance. Furthermore, the storage portion 18 stores one or more pieces of apparatus specification information respectively in correspondence with one or more users of the image forming apparatus 10 and one or more external communication devices that can transmit print jobs to the image forming apparatus 10. For example, the apparatus specification information is an IP address of the information processing apparatus 20 in the communication network 30. That is, in the present embodiment, the apparatus specification information indicates the information processing apparatus 20.

Meanwhile, an error may occur while a job is executed by an image processing apparatus such as the image forming apparatus 10. In that case, the user solves the cause of the error at the site where the image processing apparatus is installed, and re-executes the job. It is noted that there is known a related technology in which, when an error occurs in an image processing apparatus, an information processing apparatus such as a mobile terminal is notified of the occurrence of the error and the error handling method.

However, the above-mentioned related technology only allows the information processing apparatus to recognize the occurrence of the error in the image processing apparatus and the error handling method, but cannot solve the error of the image processing apparatus at a place remote from the image processing apparatus. On the other hand, the image processing system 100 can solve the error of the job at a place remote from the image forming apparatus 10 and re-execute the job, as explained below.

Specifically, the storage portion 18 stores in advance a transmission control program that causes the CPU of the control portion 15 to execute a transmission control process (see the flowchart of FIG. 3) that is described below. It is noted that the transmission control program may be recorded on a computer-readable recording medium such as a CD, a DVD, or a flash memory, and installed from the recording medium to a storage portion such as the storage portion 18.

As shown in FIG. 1, the control portion 15 includes an authentication control portion 151, a first specification portion 152, a data control portion 153, a second specification portion 154, a first execution portion 155, a detection portion 156, a first transmission portion 157, and a second execution portion 158. The control portion 15 functions as the authentication control portion 151, the first specification portion 152, the data control portion 153, the second specification portion 154, the first execution portion 155, the detection portion 156, the first transmission portion 157, and the second execution portion 158, when it executes, using the CPU, the transmission control program stored in the storage portion 18. Here, the control portion 15 functioning as the second execution portion 158 is an example of the job executing portion of the present disclosure.

The authentication control portion 151 executes an authentication process of allowing the user to log in depending on the authentication operation. Specifically, the authentication control portion 151, as necessary, causes the operation display portion 16 to display an authentication screen for the authentication operation to be performed. The authentication control portion 151 then receives login information that was input, through an input operation, by the user on the authentication screen displayed on the operation display portion 16. Here, the input operation is an example of the authentication operation. Subsequently, when the login information input from the operation display portion 16 is included in the authentication information, the authentication control portion 151 determines that the authentication is completed, and allows the user to log in the image forming apparatus 10. It is noted that when a logout operation is performed on the operation display portion 16, or when a predetermined time period has passed, or when another user is to be logged in, a logout process is executed to cause the user who is currently logging in to be logged out.

The first specification portion 152 specifies the information processing apparatus 20 that corresponds to the user who has logged in the image forming apparatus 10. Specifically, the first specification portion 152 obtains, from the storage portion 18, the apparatus specification information that corresponds to the user who has logged in the image forming apparatus 10, and specifies the information processing apparatus 20 based on the apparatus specification information.

The data control portion 153, when a transmission job is executed, stores image data that was input to the image forming apparatus 10, into the storage portion 18; and deletes the image data from the storage portion 18 after the transmission job ends normally. In addition, when the transmission job is executed, the data control portion 153 stores the first setting information that is set for the transmission job, into the storage portion 18.

The second specification portion 154 specifies the information processing apparatus 20 that corresponds to the transmission source of a print job. Specifically, when the print job is transmitted from the external communication device via the communication network 30, the second specification portion 154 obtains, from the storage portion 18, the apparatus specification information that corresponds to the external communication device from which the print job was transmitted, and specifies the information processing apparatus 20 based on the apparatus specification information.

The first execution portion 155 executes the job. Specifically, when an execution of a transmission job is instructed from the user through an operation input on the operation display portion 16, the first execution portion 155 executes the transmission job based on the first setting information. In addition, when a print job is transmitted from the external communication device via the communication network 30, the first execution portion 155 executes the print job based on the second setting information.

Here, when an error occurs in a job in execution, the first execution portion 155 outputs error identification information to the detection portion 156, wherein the error identification information identifies the error that has occurred in the job. For example, the error identification information is a multiple-digit error code.

The detection portion 156 detects an error that has occurred in a job executed by the first execution portion 155 or the second execution portion 158. Specifically, when the error identification information is output from the first execution portion 155 or the second execution portion 158, the detection portion 156 detects a job error.

In addition, upon detecting a job error, the detection portion 156 causes the first execution portion 155 or the second execution portion 158 to stop the execution of the job. In addition, when an error occurs in a print job, the detection portion 156 stores the second setting information and image data that has not been output, into the storage portion 18.

When the detection portion 156 detects a transmission job error, the first transmission portion 157 transmits the first setting information and the error information concerning the detected error to the information processing apparatus 20 that has been set in advance. Specifically, the first transmission portion 157 sets the information processing apparatus 20 that has been specified by the first specification portion 152, as the transmission destination of the error information and the first setting information. Here, the error information includes the error identification information and apparatus type identification information identifying the apparatus type of the image forming apparatus 10.

In addition, when the detection portion 156 detects a print job error, the first transmission portion 157 transmits, as in detection of a transmission job error, the error information and the second setting information to the information processing apparatus 20 that has been set in advance. Specifically, the first transmission portion 157 sets the information processing apparatus 20 that has been specified by the second specification portion 154, as the transmission destination of the error information and the second setting information.

Here, the first transmission portion 157 transmits a part of or all of the setting information that has been set in advance in correspondence with the error identification information, to the information processing apparatus 20. Specifically, in the image forming apparatus 10, a part of or all of the setting information is stored in correspondence with the error identification information in advance in the storage portion 18.

For example, when a transmission job error identified by the error identification information is a transmission failure caused by being unable to specify the transmission destination, the first transmission portion 157 transmits information indicating a transmission destination of image data, the information included in the first setting information.

In addition, when a print job error identified by the error identification information is a print paper shortage, the first transmission portion 157 transmits information indicating the output magnification of image data, information indicating the sheet feed cassette to be used, and information indicating the sheet size, the information included in the second setting information.

It is noted that when the setting information corresponding to the error identification information is not stored in the storage portion 18, the first transmission portion 157 does not transmit the setting information, transmitting only the error information. For example, when a transmission job error identified by the error identification information is a transmission error caused by the network setting of the transmission destination side, the first transmission portion 157 does not transmit the first setting information.

The second execution portion 158 re-executes the job based on a re-execution instruction transmitted from the information processing apparatus 20 with respect to the job, and the setting information that has been changed by the information processing apparatus 20.

Here, when the job to be re-executed is a transmission job, the second execution portion 158 executes the transmission job based on the first setting information and the image data that were stored in the storage portion 18 by the data control portion 153. That is, the second execution portion 158 re-executes the transmission job based on a part of the first setting information transmitted from the information processing apparatus 20 and a part of the first setting information stored in the storage portion 18. In addition, when the job to be re-executed is a print job, the second execution portion 158 executes the print job based on the image data that had not been output and the second setting information that were stored in the storage portion 18 by the detection portion 156.

It is noted that, as in the first execution portion 155, when an error occurs in a job in execution, the second execution portion 158 outputs the error identification information to the detection portion 156.

[Information Processing Apparatus 20]

As shown in FIG. 1, the information processing apparatus 20 is an information processing apparatus that includes a control portion 21, an operation display portion 22, a communication portion 23, and a storage portion 24. Specifically, in the image processing system 100, the information processing apparatus 20 is a mobile terminal such as a smartphone, a mobile telephone, or a tablet terminal. It is noted that the information processing apparatus 20 may be an information processing apparatus such as a personal computer.

The control portion 21 includes control equipment (not shown) such as CPU, ROM, RAM, and EEPROM. The CPU is a processor for executing various types of arithmetic processes. The ROM is a nonvolatile storage portion in which various types of information such as control programs for causing the CPU to execute various types of processes are stored in advance. The RAM is a volatile storage portion, and the EEPROM is a nonvolatile storage portion. The RAM and the EEPROM are used as temporary storage memories (working areas) for the various types of processes executed by the CPU. The control portion 21 comprehensively controls the information processing apparatus 20 by executing the various types of control programs stored in advance in the ROM or the storage portion 24, by using the CPU. It is noted that the control portion 21 may be formed as an electronic circuit such as an integrated circuit (ASIC).

The operation display portion 22 includes a display portion and an operation portion. The display portion is, for example, a liquid crystal panel that displays various types of information based on control instructions from the control portion 21. The operation portion is composed of, for example, operation keys or a touch panel through which various types of information are input to the control portion 21 based on user's operations.

The communication portion 23 performs a wired or wireless data communication with an external communication apparatus such as the image forming apparatus 10 via the communication network 30.

The storage portion 24 is a storage portion such as SSD or HDD, and data is read therefrom or written thereto by the control portion 21.

The storage portion 24 also stores in advance a setting change program that causes the control portion 21 to execute a setting change process (see the flowchart shown in FIG. 4) that is described below. It is noted that the setting change program may be recorded in a computer-readable recording medium such as a CD, a DVD, or a flash memory, and may be installed from the recording medium to a storage portion such as the storage portion 24.

As shown in FIG. 1, the control portion 21 includes a display control portion 211, a changing portion 212, and a second transmission portion 213. The control portion 21 functions as the display control portion 211, the changing portion 212, and the second transmission portion 213, when it executes, using the CPU, the setting change program stored in the storage portion 24.

Upon receiving the error information and the setting information transmitted from the image forming apparatus 10, the display control portion 211 obtains handling information that indicates the content of the error identified by the error identification information and the error handling method, and displays, on the operation display portion 22, an error screen that shows the contents of the setting information and the handling information.

The display control portion 211 obtains the handling information from, for example, an external server. Specifically, the display control portion 211 transmits the error information to the server via the communication network 30. Here, the server stores in advance the error identification information and the handling information in correspondence with each other, for each apparatus type of the image forming apparatus 10. Upon receiving the error information from the information processing apparatus 20, the server identifies the apparatus type of the image forming apparatus 10 based on the apparatus type identification information included in the error information, obtains the handling information that corresponds to the error identification information for the identified apparatus type, and transmits the handling information to the information processing apparatus 20. It is noted that the handling information is, for example, text data or image data that indicates the content of the error and the error handling method. It is noted that the handling information may be audio data or video data.

The changing portion 212 is configured to change the setting information transmitted from the image forming apparatus 10. Specifically, the changing portion 212 displays, on the operation display portion 22 in response to a change instruction operation performed by the user on the error screen, a setting change screen which is used to change the setting information. The changing portion 212 changes the setting information in response to a setting change operation performed by the user on the setting change screen.

The second transmission portion 213 is configured to transmit, to the image forming apparatus 10, a job re-execution instruction that includes the setting information that has been changed by the changing portion 212. Specifically, the second transmission portion 213 is configured to transmit the job re-execution instruction based on an execution instruction operation performed by the user on the error screen.

The following describes the transmission control process executed by the image forming apparatus 10, and the setting change process executed by the information processing apparatus 20 in the image processing system 100.

[Transmission Control Process]

Figure 3:
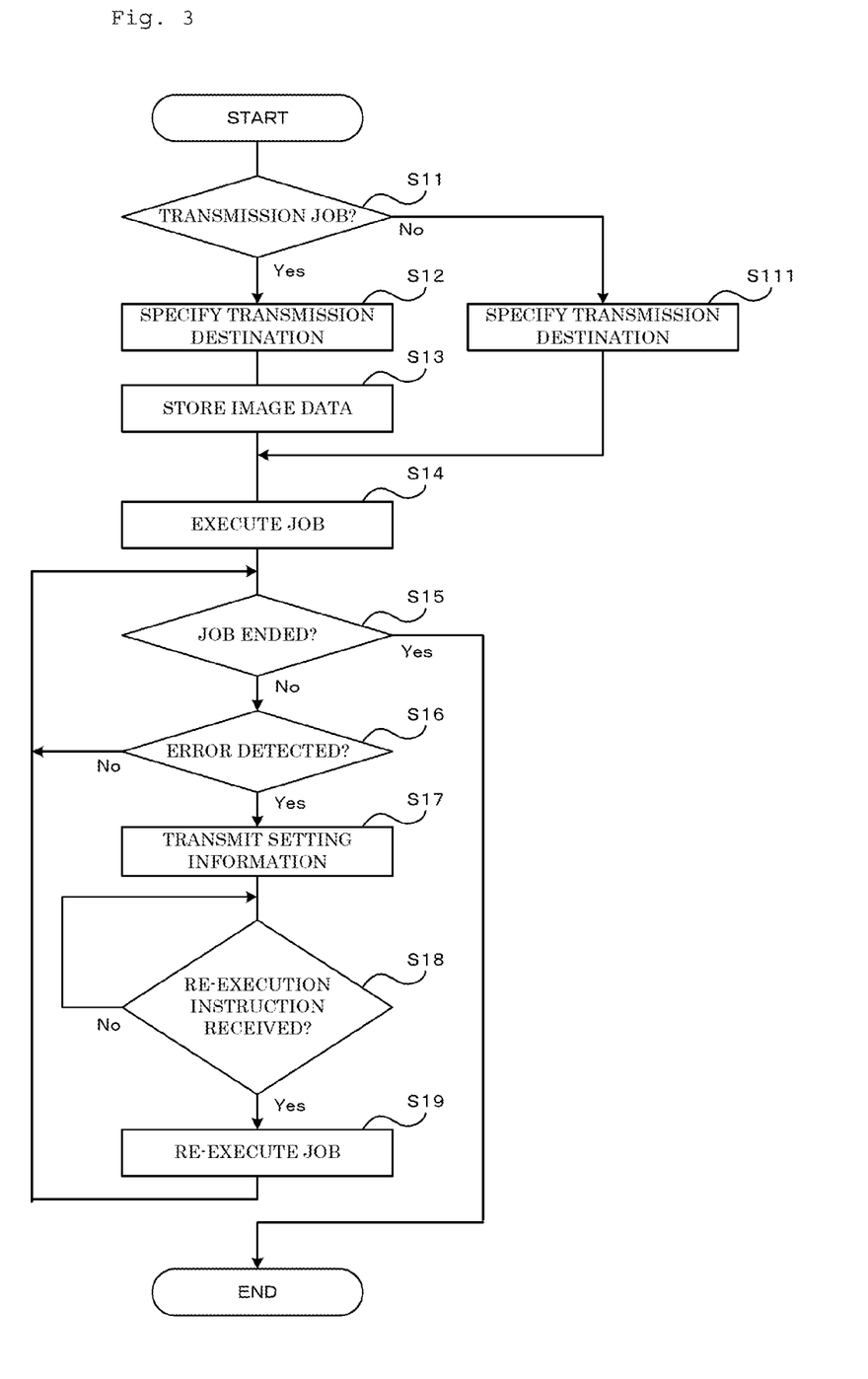
FIG. 3 is a flowchart showing an example of a transmission control process executed by the image forming apparatus according to the embodiment of the present disclosure.

First, an example of the procedure of the transmission control process executed by the control portion 15 in the image forming apparatus 10 is described with reference to FIG. 3. Here, steps S11, S12, . . . represent numbers of the processing procedures (steps) executed by the control portion 15. It is noted that the control portion 15 executes the transmission control process when a user of the image forming apparatus 10 performs, on the operation display portion 16, an operation to input an instruction to execute a transmission job, and the image reading portion 2 reads image data from the document sheet. In addition, the control portion 15 executes the transmission control process when a print job is transmitted from an external communication apparatus via the communication network 30.

Here, in the image forming apparatus 10, the user needs to log in the image forming apparatus 10 in advance before using the image forming apparatus 10. That is, in the image forming apparatus 10, the authentication process is executed before the transmission job is executed. Here, the authentication process is executed by the authentication control portion 151 of the control portion 15.

<Step S11>

First, in step S11, the control portion 15 determines whether or not the job to be executed is a transmission job.

Upon determining that the job to be executed is a transmission job (Yes side at S11), the control portion 15 moves the process to step S12. In addition, upon determining that the job to be executed is not a transmission job (No side at S11), the control portion 15 moves the process to step S111.

<Step S111>

In step S111, the control portion 15 specifies the information processing apparatus 20 that corresponds to the transmission source of the print job. The control portion 15 sets the specified information processing apparatus 20 as the transmission destination of the error information and the second setting information.

Specifically, the control portion 15 obtains, from the storage portion 18, the apparatus specification information that corresponds to the external communication apparatus from which the print job was transmitted, and specifies the information processing apparatus 20 based on the apparatus specification information. Here, the process for specifying the information processing apparatus 20 in the step S111 is executed by the second specification portion 154 of the control portion 15.

In addition, the control portion 15 sets the specified information processing apparatus 20 as the transmission destination of the error information and the second setting information, by storing the obtained apparatus specification information into a predetermined area of the RAM. Here, the process of setting the transmission destination of the error information and the second setting information in the step S111 is executed by the first transmission portion 157 of the control portion 15.

<Step S12>

In step S12, the control portion 15 specifies the information processing apparatus 20 that corresponds to the user who has logged in the image forming apparatus 10. The control portion 15 then sets the specified information processing apparatus 20 as the transmission destination of the error information and the first setting information.

Specifically, the control portion 15 obtains, from the storage portion 18, the apparatus specification information that corresponds to the user who has logged in, and specifies the information processing apparatus 20 based on the apparatus specification information. Here, the process for specifying the information processing apparatus 20 in the step S12 is executed by the first specification portion 152 of the control portion 15.

In addition, as in the step S111, the control portion 15 sets the specified information processing apparatus 20 as the transmission destination of the error information and the first setting information, by storing the obtained apparatus specification information into the predetermined area of the RAM. Here, the process of setting the transmission destination of the error information and the first setting information in the step S12 is executed by the first transmission portion 157 of the control portion 15.

<Step S13>

In step S13, the control portion 15 stores the image data read by the image reading portion 2 and the first setting information into the storage portion 18. With this configuration, even when the control program of the image forming apparatus 10 has been set to delete image data and the first setting information if the transmission job ends due to an error, the setting of the transmission job and the reading of image data from the document sheet, performed by the image reading portion 2, do not need to be performed again. Here, the process of the step S13 is executed by the data control portion 153 of the control portion 15.

<Step S14>

In step S14, the control portion 15 executes the job based on the setting information. Here, the process of the step S14 is executed by the first execution portion 155 of the control portion 15.

<Step S15>

In step S15, the control portion 15 determines whether or not the job executed in the step S14 ended.

Here, upon determining that the job ended (Yes side at S15), the control portion 15 ends the transmission control process. It is noted that in the case where, in the step S13, the image data and the first setting information were stored in the storage portion 18, the control portion 15 deletes the image data and the first setting information from the storage portion 18 after ending the transmission control process. Here, the process for deleting the image data and the first setting information from the storage portion 18 is executed by the data control portion 153 of the control portion 15. In addition, upon determining that the job has not ended (No side at S15), the control portion 15 moves the process to step S16.

<Step S16>

In step S16, the control portion 15 determines whether or not an error has been detected with respect to the job executed in the step S14. Specifically, the control portion 15 determines that an error of the job has been detected when the error identification information has been output. Here, the process of the step S16 is an example of the detection step of the present disclosure, and the process of the step S16 is executed by the detection portion 156 of the control portion 15.

Here, upon determining that an error of the job has been detected (Yes side at S16), the control portion 15 stops the execution of the job, and when the job is a print job, stores image data that has not been output and the second setting information into the storage portion 18. Subsequently, the control portion 15 moves the process to step S17. Upon determining that an error of the job has not been detected (No side at S16), the control portion 15 returns the process to the step S15, and waits for the job to end or an error to be detected with respect to the job.

<Step S17>

In step S17, the control portion 15 transmits the setting information and the error information concerning the error detected in the step S16 to the information processing apparatus 20 that was set as the transmission destination in the step S11 or the step S12. Here, the process of the step S17 is an example of the first transmission step of the present disclosure, and the process of the step S17 is executed by the first transmission portion 157 of the control portion 15.

Here, the control portion 15 obtains the setting information that corresponds to the error identification information from the storage portion 18, and transmits the obtained setting information. It is noted that when the setting information that corresponds to the error identification information is not stored in the storage portion 18, the control portion 15 does not transmit the setting information, and transmits only the error information. This restricts the amount of data that is transmitted to the information processing apparatus 20, speeding up the data transmission, and also makes it possible to avoid a case where the user who is changing the setting information in the information processing apparatus 20 is bewildered by the presence of setting information that is irrelevant to solving the error.

<Step S18>

In step S18, the control portion 15 determines whether or not the re-execution instruction has been received from the information processing apparatus 20 in which the error information and the setting information were transmitted in the step S17.

Here, upon determining that the re-execution instruction has been received from the information processing apparatus 20 (Yes side at S18), the control portion 15 moves the process to step S19. Upon determining that the re-execution instruction has not been received from the information processing apparatus 20 (No side at S18), the control portion 15 waits at the step S18 for the re-execution instruction to be received from the information processing apparatus 20.

<Step S19>

In step S19, the control portion 15 re-executes the job based on the re-execution instruction received in the step S18 and the setting information included in the re-execution instruction. Here, when the job that is to be re-executed is a transmission job, the control portion 15 executes the transmission job based on the image data and the first setting information that were stored in the storage portion 18 in the step S13. When the job that is to be re-executed is a print job, the control portion 15 executes the print job based on the image data that had not been output and the second setting information that were stored in the storage portion 18 in the step S16. Here, the process of the step S19 is an example of the job execution step of the present disclosure, and the process of the step S19 is executed by the second execution portion 158 of the control portion 15.

[Setting Change Process]

Figure 4:
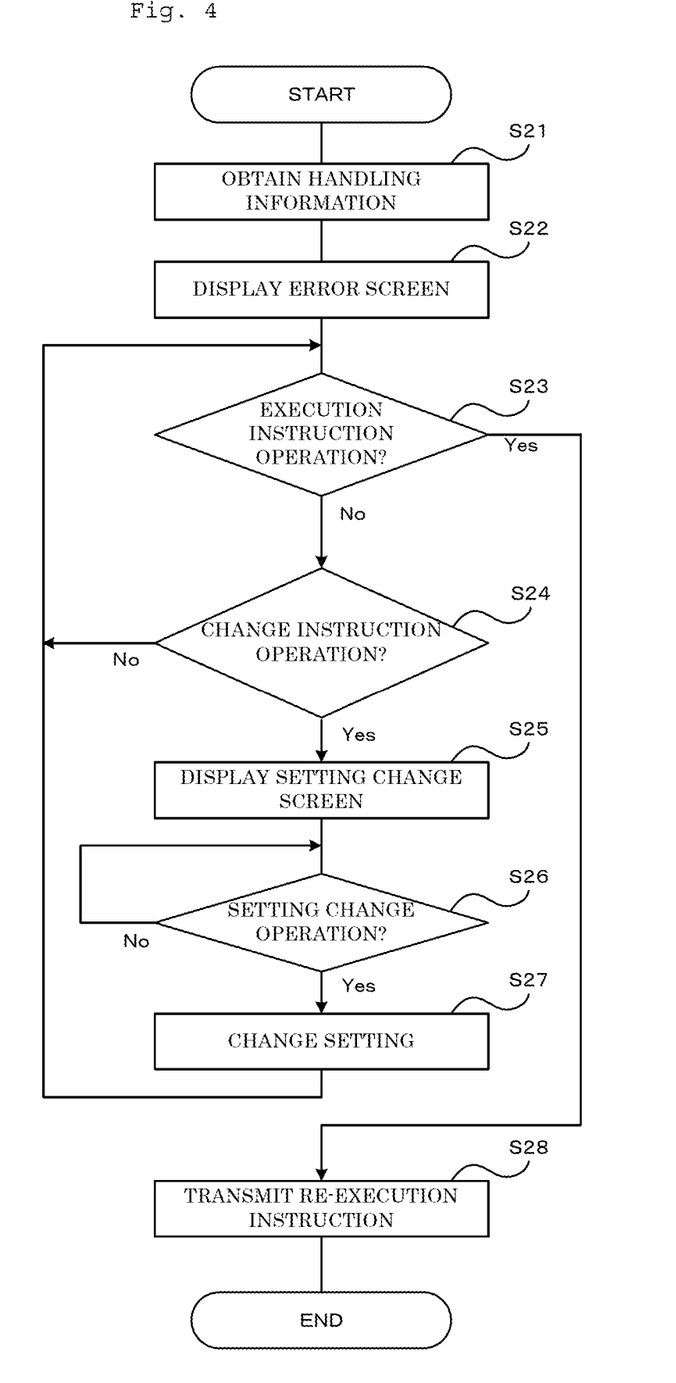
FIG. 4 is a flowchart showing an example of a setting change process executed by the information processing apparatus according to the embodiment of the present disclosure.

Next, an example of the procedure of the setting change process executed by the control portion 21 in the information processing apparatus 20 is described with reference to FIG. 4. It is noted that the control portion 21 executes the setting change process when the error information and the setting information are received from the image forming apparatus 10.

<Step S21>

First, in step S21, the control portion 21 transmits the error information received from the image forming apparatus 10 to the server, and obtains the handling information from the server.

Here, upon receiving the error information from the information processing apparatus 20, the server identifies the apparatus type of the image forming apparatus 10 based on the apparatus type identification information included in the error information. The server then obtains the handling information that corresponds to the error identification information for the identified apparatus type, and transmits the obtained handling information to the information processing apparatus 20. In this way, when the error information transmitted from the information processing apparatus 20 to the server includes the apparatus type identification information, it is possible to absorb the differences in the content of the error identification information and the data format, that are generated due to a difference in the apparatus type of the image forming apparatus 10. It is thus possible to prevent obtaining erroneous handling information.

It is noted that, as another configuration, the error identification information and the handling information may be stored in correspondence with each other for each apparatus type of the image forming apparatus 10, in advance in the storage portion 24, and the control portion 21 may obtain the handling information from the storage portion 24 based on the error information received from the image forming apparatus 10. Alternatively, as a still another configuration, the image forming apparatus 10 may transmit the error information including the handling information to the information processing apparatus 20. In comparison to these configurations, with the configuration where the handling information is obtained from the server, it is unnecessary to ensure a storage capacity for storing the handling information in the storage portion 18 of the image forming apparatus 10 or the storage portion 24 of the information processing apparatus 20, and it is possible to simplify the configuration.

<Step S22>

In step S22, the control portion 21 displays the error screen on the operation display portion 22, wherein the error screen shows the contents of the setting information received from the image forming apparatus 10 and the handling information obtained in the step S21. Here, the processes of the steps S21 and S22 are executed by the display control portion 211 of the control portion 21.

Figure 5:
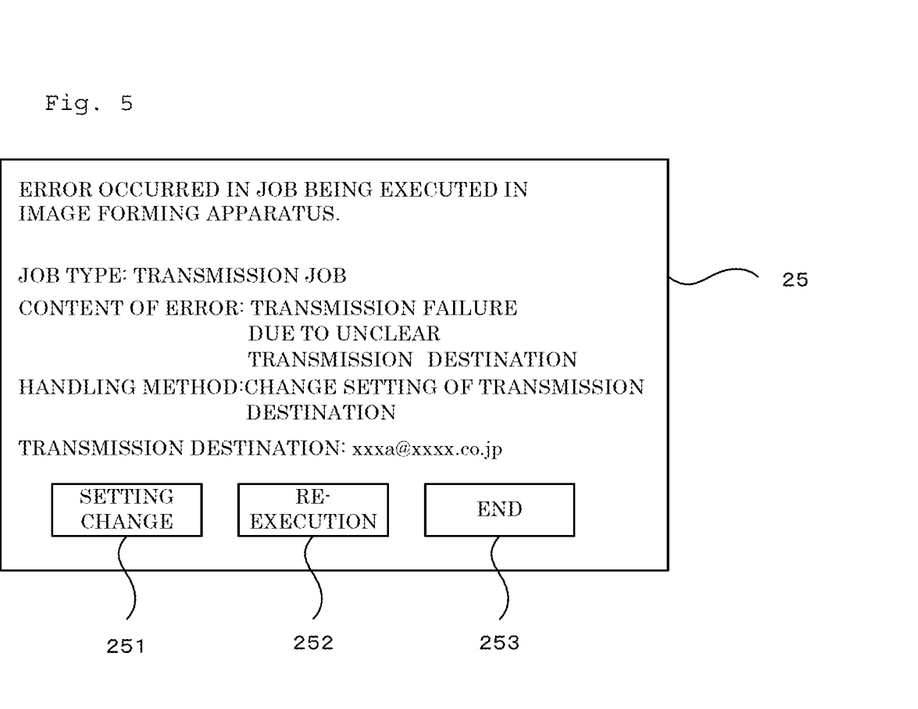
FIG. 5 is a diagram showing an example of an error screen displayed on the information processing apparatus according to the embodiment of the present disclosure.

FIG. 5 shows an example of the error screen displayed in the step S22. In a display screen 25 shown in FIG. 5, the contents of the handling information and the setting information are shown in the case where a transmission job error has occurred and the transmission job error is a transmission failure caused by being unable to specify the transmission destination. In addition, in the display screen 25, a setting change key 251, a re-execution key 252, and an end key 253 are displayed, wherein the setting change key 251 is used for a change instruction operation, the re-execution key 252 is used for an execution instruction operation, and the end key 253 is used for an operation to end the setting change process. With this configuration, the user can confirm the contents of the setting information and the handling information displayed on the display screen 25, and select: changing the setting information; re-executing the job; or ending the setting change process.

It is noted that when a print job error is a print sheet shortage, the error screen displayed indicates the fact and urges the user to change the settings of the output magnification of image data; the sheet feed cassette to be used; and the sheet size. In addition, when a transmission job error is a transmission failure caused by the network setting of the transmission destination side, the error screen displayed indicates the fact and urges the user to change the network setting of the transmission destination side, or confirm the connection of the network cable, or the like.

<Step S23>

In step S23, the control portion 21 determines whether or not the user has performed the execution instruction operation on the error screen displayed in the step S22. For example, when the re-execution key 252 has been operated on the display screen 25, the control portion 21 determines that the user has performed the execution instruction operation.

Upon determining that the user has performed the execution instruction operation (Yes side at S23), the control portion 21 moves the process to step S28. Upon determining that the user has not performed the execution instruction operation (No side at S23), the control portion 21 moves the process to step S24.

<Step S24>

In step S24, the control portion 21 determines whether or not the user has performed the change instruction operation on the error screen displayed in the step S22. For example, when the setting change key 251 has been operated on the display screen 25, the control portion 21 determines that the user has performed the change instruction operation.

Upon determining that the user has performed the change instruction operation (Yes side at S24), the control portion 21 moves the process to step S25. Upon determining that the user has not performed the change instruction operation (No side at S24), the control portion 21 returns the process to step S23 and waits for the user to perform the execution instruction operation or the change instruction operation.

It is noted that when a print job error that has occurred in the image forming apparatus 10 is a paper jam, the user may take out one or more sheets of paper from inside the image forming apparatus 10 and directly instruct the image forming apparatus 10 to resume the print job. As a result, in the setting change process, the control portion 21 ends the setting change process when the end key 253 is operated by the user on the display screen 25.

<Step S25>

In step S25, the control portion 21 displays the setting change screen on the operation display portion 22.

Figure 6:
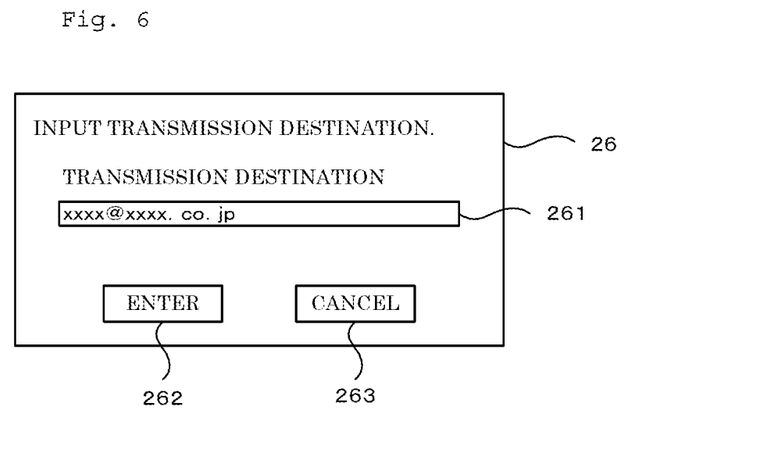
FIG. 6 is a diagram showing an example of a setting change screen displayed on the information processing apparatus according to the embodiment of the present disclosure.

FIG. 6 shows an example of the setting change screen displayed in the step S25. A display screen 26 shown in FIG. 6 is displayed when the setting change key 251 is operated on the display screen 25. In the display screen 26, a setting change column 261 for changing the setting information is displayed, and the user can change the setting information by performing an input operation in the setting change column 261. For example, the transmission destination "xxxa@xxxx.co.jp" which was displayed on the display screen 25 is changed to "xxxx@xxxx.co.jp" on the display screen 26. In addition, an enter key 262 and a cancel key 263 are displayed on the display screen 26, wherein the enter key 262 is operated to confirm the change made to the setting information, and the cancel key 263 is operated to cancel the change made to the setting information. On the display screen 26, the user can end making a change to the setting information, by operating the enter key 262 or the cancel key 263.

<Step S26>

In step S26, the control portion 21 determines whether or not the user performed a setting change operation on the setting change screen. For example, when the enter key 262 is operated on the display screen 26, the control portion 21 determines that a setting change operation was performed.

Upon determining that a setting change operation was performed (Yes side at S26), the control portion 21 moves the process to step S27. In addition, upon determining that a setting change operation has not been performed (No side at S26), the control portion 21 waits at the step S26 for the user to perform a setting change operation. It is noted that in the setting change process, the control portion 21 returns the process to the step S23 when the user operates the cancel key 263 on the display screen 26.

<Step S27>

In step S27, the control portion 21 changes the setting information based on a setting change operation performed by the user on the setting change screen. Subsequently, the control portion 21 displays the error screen on the operation display portion 22. Here, the control portion 21 displays the error screen based on the changed setting information. This enables the user to confirm the changed settings before performing the execution instruction operation. Here, the process of the step S27 is an example of the change step of the present disclosure, and the process of the step S27 is executed by the changing portion 212 of the control portion 21.

<Step S28>

In step S28, the control portion 21 transmits the re-execution instruction to the image forming apparatus 10 based on the execution instruction operation performed on the error screen. The control portion 21 then ends the setting change process. Here, the process of the step S28 is an example of the second transmission step of the present disclosure, and the process of the step S28 is executed by the second transmission portion 213 of the control portion 21.

When the setting information is changed in the step S27, the re-execution instruction including the changed setting information is transmitted to the image forming apparatus 10. This makes it possible for the image forming apparatus 10 to re-execute the job based on the changed setting information, and solve the error of the job that was caused by the setting information.

As described above, in the image processing system 100, the image forming apparatus 10 re-executes the job in which the error occurred, based on the setting information changed by the information processing apparatus 20. With this configuration, it is possible to solve the error of the job which is executed by the image forming apparatus 10, at a site remote from the image forming apparatus 10, and allow the job to be re-executed.

It is noted that when the information processing apparatus 20 is an always-carried mobile terminal, the user can immediately recognize an occurrence of an error in the image forming apparatus 10, and, at the place where the user is, change the setting to solve the error. As a result, compared to a case where the information processing apparatus 20 is a desk-top personal computer, it is possible to handle an error as soon as it occurs in the image forming apparatus 10.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing system comprising:
   an image processing apparatus configured to execute a job related to image processing;
   a detection portion configured to detect an error of the job executed by the image processing apparatus;
   a storage portion included in the image processing apparatus and configured to store image data;
   a first transmission portion configured to transmit error information and setting information to a predetermined information processing apparatus, the error information being related to the error detected by the detection portion, the setting information being related to the job in which the error occurred;
   a changing portion provided in the information processing apparatus and configured to change the setting information;
   a second transmission portion provided in the information processing apparatus and configured to transmit, to the image processing apparatus, a re-execution instruction that includes the setting information that has been changed by the changing portion, the re-execution instruction instructing to re-execute the job; and
   a job executing portion configured to re-execute the job based on the image data stored in the storage portion and the setting information and the re-execution instruction transmitted by the second transmission portion; wherein
   the setting information includes one or more of: a transmission destination of image data read in an image reading process; a sheet feed cassette selected to be used in an image forming process; a sheet size for use in the image forming process; and an output magnification of image data in the image forming process;
   the first transmission portion transmits a part or all of the setting information that is set in advance in correspondence with the error information, to the information processing apparatus;
   the error information includes apparatus type identification information identifying an apparatus type of the image processing apparatus; and
   the information processing apparatus obtains handling information that indicates an error handling method for handling the error that has been associated in advance with the apparatus type of the image processing apparatus identified by the apparatus type identification information, and displays, on a display portion, the handling information and the setting information received from the image processing apparatus.

2. The image processing system according to claim 1 further comprising
   a data control portion configured to, when the job is a transmission job in which image data read in an image reading process is transmitted to a specified transmission destination, store the image data input to the image processing apparatus into a storage portion and delete the image data from the storage portion after the job ends normally, wherein
   the job executing portion reads, from the storage portion, image data that corresponds to the re-execution instruction, and executes the transmission job.

3. The image processing system according to claim 1, wherein
   the image processing apparatus further includes:
   an authentication control portion configured to allow a user to log in the image processing apparatus depending on a predetermined authentication operation; and
   a first specification portion configured to specify an information processing apparatus that corresponds to the user who has logged in the image processing apparatus, wherein
   the first transmission portion sets the information processing apparatus that was specified by the first specification portion when the job was executed, as a transmission destination of the error information and the setting information.

4. The image processing system according to claim 1, wherein
   the job includes a print job in which an image forming process is executed based on image data,
   the image processing apparatus further includes a second specification portion configured to specify an information processing apparatus that corresponds to a transmission destination of the print job, and
   the first transmission portion sets the information processing apparatus that was specified by the second specification portion, as a transmission destination of the error information and the setting information.

5. The image processing system according to claim 1, wherein
   the information processing apparatus is a mobile terminal.

6. An image processing apparatus comprising:
a detection portion configured to detect an error of a job related to image processing;
a storage portion configured to store image data;
a first transmission portion configured to transmit error information and setting information to a predetermined information processing apparatus, the error information being related to the error detected by the detection portion, the setting information being related to the job in which the error occurred; and
a job executing portion configured to re-execute the job based on the image data stored in the storage portion and a re-execution instruction transmitted from the information processing apparatus, and the setting information that has been changed by the information processing apparatus; wherein
the setting information includes one or more of: a transmission destination of image data read in an image reading process; a sheet feed cassette selected to be used in an image forming process; a sheet size for use in the image forming process; and an output magnification of image data in the image forming process;
the first transmission portion transmits a part or all of the setting information that is set in advance in correspondence with the error information, to the information processing apparatus; and
the error information includes apparatus type identification information identifying an apparatus type of the image processing apparatus.

7. An information processing apparatus comprising:
a changing portion configured to change setting information that is received from an image processing apparatus that executes a job related to image processing, the setting information being related to the job; and
a second transmission portion configured to transmit, to the image processing apparatus, a re-execution instruction that includes the setting information that has been changed by the changing portion, the re-execution instruction instructing to re-execute the job; wherein
when error information that includes apparatus type identification information identifying an apparatus type of the image processing apparatus, is received from the image processing apparatus, handling information that indicates an error handling method for handling an error that has been associated in advance with the apparatus type of the image processing apparatus identified by the apparatus type identification information, is obtained and the handling information and the setting information received from the image processing apparatus are displayed on a display portion.

\* \* \* \* \*